(12) United States Patent
Horn (10) Patent No.: US 8,289,574 B2
(45) Date of Patent: Oct. 16, 2012

(54) METHOD AND SYSTEM FOR CONTROLLING DARKENING OF IMAGE DATA

(75) Inventor: Richard T. Horn, Claremont, CA (US)

(73) Assignee: Xerox Corporation, Norwalk, CT (US)

( * ) Notice: Subject to any disclaimer, the term of this patent is extended or adjusted under 35 U.S.C. 154(b) by 613 days.

(21) Appl. No.: 12/552,932

(22) Filed: Sep. 2, 2009

(65) Prior Publication Data

US 2011/0051154 A1  Mar. 3, 2011

(51) Int. Cl.
*H04N 1/40* (2006.01)
*G06K 15/00* (2006.01)

(52) U.S. Cl. ........ 358/1.9; 358/2.1; 358/3.01; 358/3.06; 358/3.09; 358/3.1; 358/3.11; 358/3.12; 358/3.3

(58) Field of Classification Search ........................ None
See application file for complete search history.

(56) References Cited

U.S. PATENT DOCUMENTS

| | | | |
|---|---|---|---|
| 5,408,329 A | 4/1995 | Mailloux et al. | 358/298 |
| 5,920,405 A | 7/1999 | McIntyre et al. | 358/442 |
| 6,181,438 B1 | 1/2001 | Bracco et al. | 358/1.9 |
| 6,606,420 B1 | 8/2003 | Loce et al. | 382/266 |
| 6,775,394 B2 | 8/2004 | Yu | 382/100 |
| 6,983,056 B1 | 1/2006 | Amano | 382/100 |
| 7,379,211 B2 | 5/2008 | Ishii et al. | 358/3.03 |
| 7,403,710 B2 | 7/2008 | Itokawa | 396/333 |
| 7,406,210 B2 | 7/2008 | Handley et al. | 382/274 |
| 7,474,428 B2 | 1/2009 | Morris-Jones et al. | 358/1.15 |
| 7,496,237 B1 | 2/2009 | Dominguez | 382/237 |
| 7,525,676 B2 | 4/2009 | Pesar | 358/1.13 |
| 2003/0081258 A1* | 5/2003 | Sugizaki | 358/3.14 |
| 2003/0152283 A1* | 8/2003 | Moriwaki | 382/274 |

* cited by examiner

*Primary Examiner* — Benny Q Tieu
*Assistant Examiner* — Haris Sabah
(74) *Attorney, Agent, or Firm* — Kermit D. Lopez; Luis M. Ortiz; Kevin Soules (57) ABSTRACT

A method and system for controlling the darkness level of image data to assist in output matching between dissimilar rendering devices. Image source information from a source file can be interpreted by a rendering decomposer in order to generate halftone source image data. The decomposition of the image can be repeated in response to a request by an operator for an additional darkening level via a user input file. The additional layers can be shifted in an opposing direction and then a clockwise direction from the original position until the additional darkening level is attained. The required darkening level can be stored in a storage unit or memory so that the required darkening level can be later triggered by a source document name to employ the same darkening approach. The darkening level can be selected from an array of darkening levels to assist in output matching without major modifications to the utilized rendering device(s).

20 Claims, 5 Drawing Sheets

METHOD AND SYSTEM FOR CONTROLLING DARKENING OF IMAGE DATA

TECHNICAL FIELD

Embodiments are generally related to rendering devices such as printers, scanners, multi-function devices, photocopy machines, and the like. Embodiments are also related to the provision of darkness control for image data.

BACKGROUND OF THE INVENTION

Documents rendered via varying rendering devices such as, for example, printers from different vendors, often generate dissimilar results. The output from such rendering devices varies due to setup conditions and the approach taken to place particular marks on media. Conventionally, a "write white" approach may be utilized wherein a spot is swept across a photoreceptor belt, where no marks are desired. Many rendering devices utilize the opposite approach, wherein the spot is located where marks are desired. One problem with such approaches is that the average bitmap images rendered on a monochrome "write white" system are typically lighter than the same images rendered on other devices. For example, a document that includes binarized images while being targeted for a particular rendering device may appear to exhibit an erroneous darkness level when transmitted to a different rendering device.

Currently, such problems may be addressed by restricting rendering of the documents to certain rendering devices or by miss tuning one or both of the conflicting rendering devices. The majority of prior art approaches normalize the rendered output from different rendering devices. In particular, there have been attempts to manipulate halftones, adjust actual dot size gain, and/or image development time. Such approaches, however, have an impact of the reusability of the rendering system for a designed output and are thus not appropriate for many rendering applications.

Based on the forgoing, it is believed that a need exists for an improved method and system for controlling the darkness level of image data (e.g., bitmap images) in order to assist output matching between dissimilar rendering devices. A need also exists for selectively testing and choosing the darkening level for image data, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring rendering devices such as printers, scanners, multi-function devices, photocopy machines, and the like.

It is another aspect of the present invention to provide for an improved method and system for controlling the darkness level of image data in order to assist output matching between dissimilar rendering devices.

It is a further aspect of the present invention to provide for an improved method for selectively testing and choosing the darkening level for image data via a user interface.

The aforementioned aspects and other objectives and advantages can now be achieved as described herein. A method and system for controlling the darkness level of image data to assist output matching from dissimilar rendering devices is disclosed. In general, image source information from a source file can be interpreted by a rendering decomposer module in order to generate halftone source image data (e.g., halftone source bitmap image). The decomposed image data is stored in memory prior to printing. If additional darkening had been requested, the source file may be automatically rewritten to redefine execution commands with respect to a subroutine that calls out a correct number of additional layers. These additional layers of the same image data are added to that already in memory in such a manner that each layer, if printed separately, would be shifted with respect to the others. The additional layers can be shifted in an opposing direction and then a clockwise direction from the original position until the additional darkening level is attained. The system can be configured to store the darkening level required such that the darkening level can be later triggered by a source document name or an internal set value to employ the same darkening approach.

Such an approach permits selection of a darkening level from an array of darkening levels to assist in output matching without major modifications to the utilized rendering device (s). The halftone cell can comprise, for example, an array of pixels, which can be stored with different color depths. The additional layers for a pictorial file can be first applied in a +45 degree direction and, if an additional darkness increase is necessary, the additional layers can be included in −45, +135, and −135 degree directions. The additional layers can be applied vertically and horizontally until a best match can be achieved. The darkening can be omitted or a reduced level of darkening can be applied for a text file.

The source image can shift one pixel to the right side and one pixel upwards when additional darkening is requested. Thereafter, a single pixel can be shifted to the left side and another pixel downward from the original position of the source image with respect to a second additional layer. For a third additional layer, one pixel may be shifted to the left side and another pixel upward from the original position of the source image. For a fourth additional layer, one pixel may be shifted to the right side and another pixel shifted downward from the original position of the source image. Additional layers can also be applied on a vertical and horizontal axis for additional darkening of the image. A user interface can be utilized to allow selectively test and choose the darkening level for images (e.g., bitmap images). The darkening of the shadow tones of a monochrome image can be done by an image overlay and the circular application of the image overlays minimizes "smudging" artifacts.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
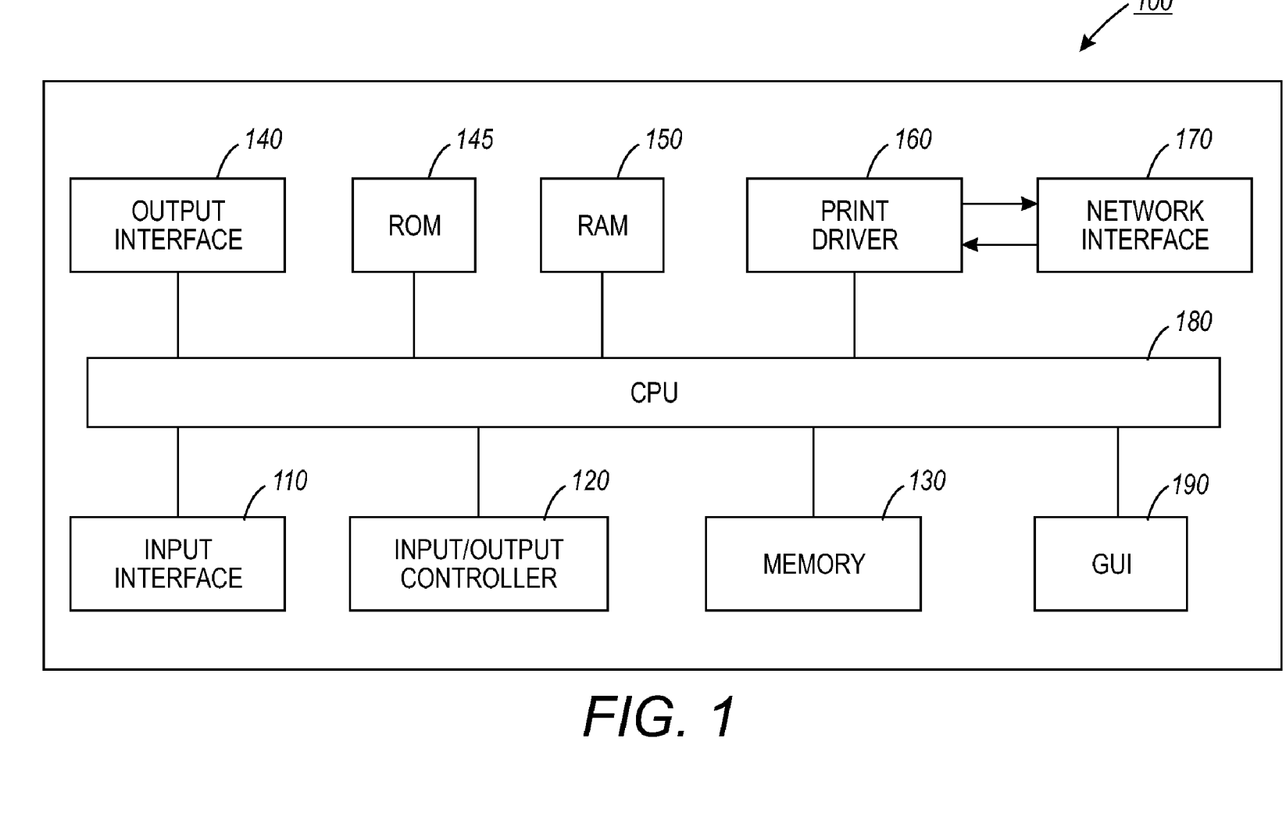
FIG. 1 illustrates a schematic view of a data-processing system in which the present invention may be embodied.
Figure 2:
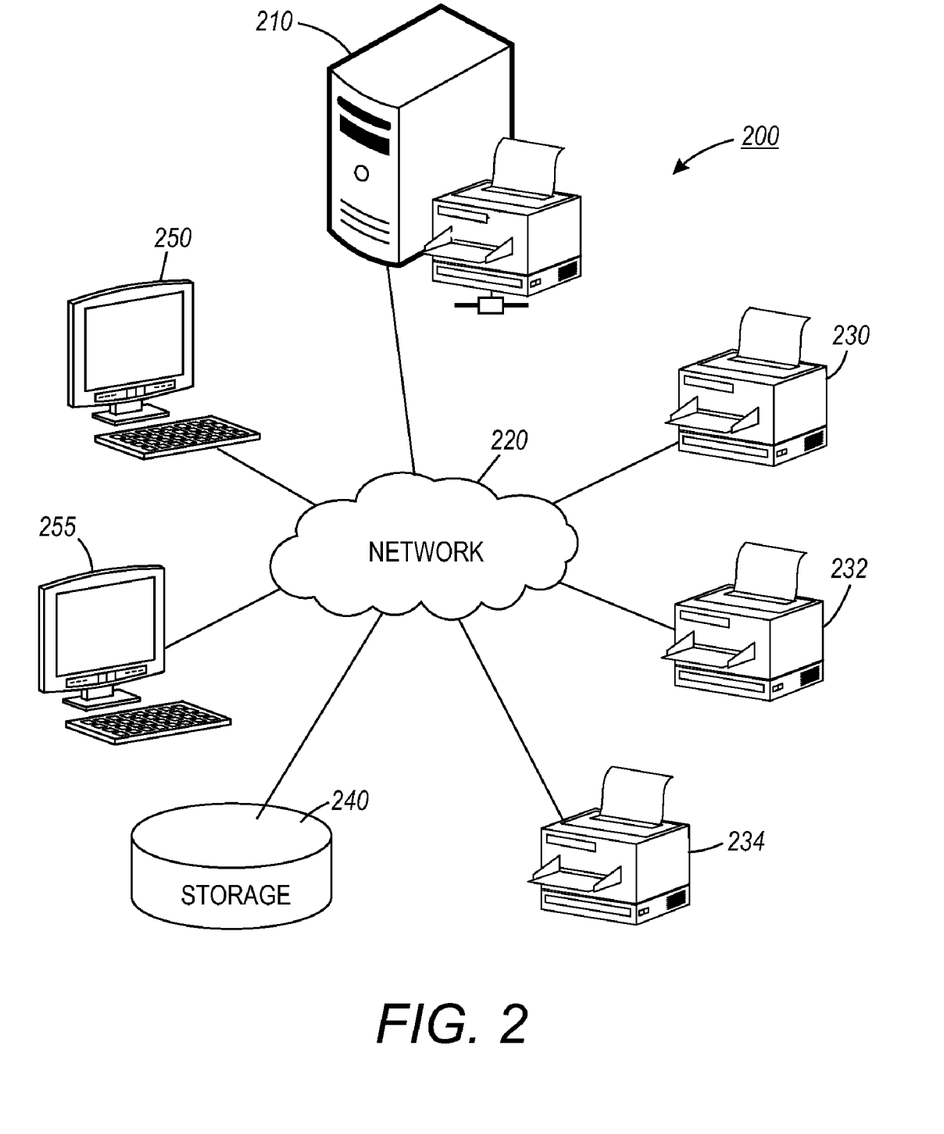
FIG. 2 illustrates a block diagram of a network rendering system for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising an input interface 110 for receiving data, a CPU 180, a memory 130, and an output interface 140. Memory 130 can be implemented as a ROM 145, RAM 150, or a combination thereof, or simply a general memory unit. Data-processing apparatus 100 represents one of many possible data processing and/or computing devices, which can be utilized in accordance with the disclosed embodiments.

The interface 190, which is preferably a graphical user interface (GUI), also serves to display results, whereupon the user may supply additional inputs or terminate the session. The input interface 110 such as, for example, a keyboard, a mouse, or another pointing device, can be connected to the CPU 180. One or more programs and data for processing a rendering job (e.g., print job) may be stored in the ROM 145. The ROM 145 may be a rewritable ROM such as an EPROM. Data information can be stored in a software module, for example, a database in memory 130. Data-processing apparatus 100 includes a universal print driver 160 comprising instructions executing on the user terminal that generate page description language (PDL) data corresponding to the rendering job and describing content layout of one or more pages to be rendered.

FIG. 2 illustrates a block diagram of a network rendering system 200, which can be implemented in accordance with a preferred embodiment. Note that in FIGS. 1-6, identical or similar blocks are generally indicated by identical reference numerals. Network rendering system 200 contains network 220, which is the medium used to provide communications links between various devices and computers connected together within network 220. Network 220 may include connections such as, for example, wire, wireless communication links, fiber optic cables, and so forth. In the depicted example, print server 210 can be connected to network 220 along with storage unit 240. In addition, end-user workstations 250 and 255 connect to network 220. These end-user workstations 250 and 255 may be, for example, personal computers or network computers. Data-processing system 100 depicted in FIG. 1 can be, for example, an end-user workstation such as end-user workstation 250 and 255. Alternatively, data-processing system 100 can be implemented as a print server, such as print server 210, depending upon design considerations.

The printer server 210 can function as an operative communication medium between the user computer terminals 250 and 255 and the rendering devices 230, 232, 234, etc. Rendering devices 230, 232 and/or 234 can be distributed at various locations throughout a building, for example, or otherwise remotely located. While three rendering devices are shown by way of example, it is to be appreciated that any number of rendering devices may be linked to the network such as two, four, six or more rendering devices. In general, the rendering devices 230, 232 and/or 234 can be utilized to perform a rendering output function (e.g., printing, scanning, copying, faxing, etc) within a networked environment. Note that rendering devices 230, 232, and 234 are generally analogous to one another. Similarly, computer terminals 250 and 255 are also generally similar to one another.

Note that as utilized herein, the term "rendering device" may refer to an apparatus or system such as a printer, scanner, fax machine, copy machine, etc., and/or a combination thereof. Preferably, rendering devices 230, 232 and/or 234 may function as a MFD (Multifunction Device) capable of multiple rendering functions such as printing, copying, scanning, faxing, etc. In some embodiments, rendering devices 230, 232, and 234 may be implemented with a single rendering function such as printing. In other embodiments, rendering devices 230, 232, and 234 can be configured to provide multiple rendering functions such as scanning, faxing, printing and copying.

Note that an example of an MED device, which may be utilized to implement rendering devices 230, 232, 234, etc., is disclosed in U.S. Pat. No. 7,525,676, entitled "System and method for controlling access to programming options of a multifunction device," which issued to Robert J. Pesar on Apr. 28, 2009. U.S. Pat. No. 7,525,676, which is assigned to the Xerox Corporation of Norwalk, Conn., is incorporated herein by reference in its entirety. Another example of an MFD device, which may be utilized to implement rendering devices 230, 232, 234, and so forth, is disclosed in U.S. Pat. No. 7,474,428, which issued to Morris-Jones, et al. on Jan. 6, 2009 and is entitled "Multifunction device system using tags containing output information." U.S. Pat. No. 7,474,428 is also assigned to the Xerox Corporation of Norwalk, Conn., and is incorporated herein by reference in its entirety. An additional example of an MFD device and/or system, which may be utilized to implement rendering devices 230, 232, 234, etc., is disclosed in U.S. Pat. No. 5,920,405, entitled "Multifunction device with printer/facsimile contention selection." U.S. Pat. No. 5,920,405, which issued to McIntyre, et al. on Jul. 6, 1999 and is assigned to the Xerox Corporation of Norwalk, Conn., is also incorporated herein by reference in its entirety.

The printer server 210 is capable of receiving documents for rendering from the user computer terminals 250 and 255 and can select one or more destination network rendering devices 230, 232, 234 for routing the documents based on, for example, user preferences or other data. The computer terminals 250, 255, etc., can be, for example, any computing device capable of being integrated within a network, such as a PDA, personal computer, cellular telephone, point-of-sale terminal, server, etc. The rendering device 230, 232 and/or 234 can be located remotely with respect to each other, or alternatively, may be located locally with respect to each other such as, for example, within a print shop or an office environment. The printer server 210 can automatically select the destination rendering devices 230, 232 and/or 234 for routing the rendering job requests.

In the depicted example, print server 210 provides data such as boot files, operating system images, and applications to end-user workstations 250 and 255. End-user workstations 250 and 255 are clients to print server 210 in this example. Network rendering system 200 may include additional servers, end-user workstations, and other devices not shown. Specifically, end-user workstations 250 and 255 may connect to any member of a network of servers, which provide equivalent content. FIG. 2 is intended as an example and not as an architectural limitation of the disclosed embodiments.

The following description is presented with respect to embodiments of the present invention, which may be embodied in the context of a data-processing system such as, for example, the data-processing system 100, the network rendering system 200, and the network 220 depicted respectively FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
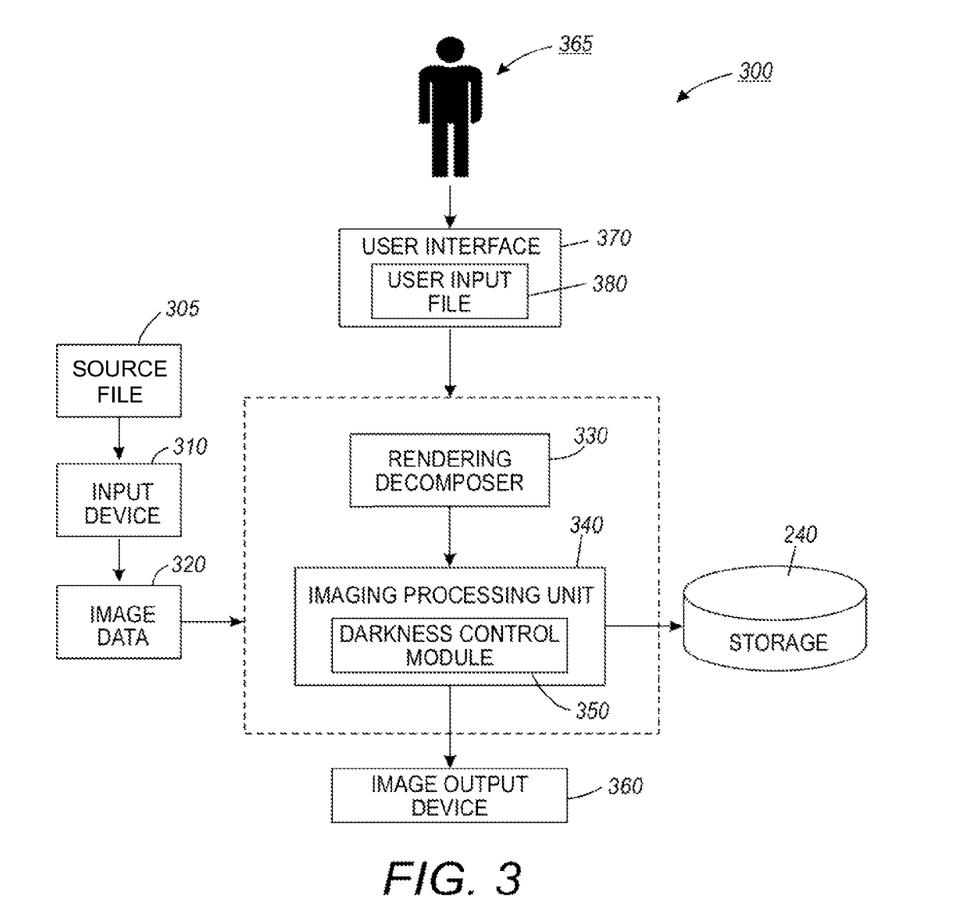
FIG. 3 illustrates a block diagram of a rendering system with a darkness control module, in accordance with a preferred embodiment.

FIG. 3 illustrates a block diagram of a rendering system 300 that includes a darkness control module 350, in accordance with a preferred embodiment. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module) and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

As indicated in FIG. 3, the rendering system 300 can receive a source file 305 through an input device 310. Image data 320 (e.g., image bitmap) can be generated from any of a plurality of input sources, including image input devices 310 (e.g., a scanner) or may be created via, for example, workstations 250 and 255 and supplied to the rendering system 300 utilizing a network such as network 220. The source file 305 can include, for example, a text file, a pictorial image file, or a combination thereof. The image information associated with the source file 305 can be generated in an image format such as, for example, a bitmap format, where the image data 320 includes a number of "gray" level cells (i.e., or hue concentration level cells for color images). Each cell can include a two-dimensional array of pixels, or cell elements, and the gray or hue level to be created in each cell can be defined by digital values, wherein each digital value represents a gray or hue concentration level among a number of gray or hue concentration levels within the area. A "pixel" is the smallest segment into which the source file 305 can be divided. In an array defining an image in which each item of data provides a value, each value indicating the color of a location may be called a "pixel value".

The image data 320 can be directed to a rendering decomposer module 330 in order to interpret the source file 305. The extracted source file information can then be directed to an image processing unit 340. The image processing unit 340 generally includes all of the digital processing requirements to convert the source file 305 (e.g., an image) from its original data representation to a format suitable for rendering at an image output device 360. The image output device 360 may be a rendering device such as the rendering device 230, 232 and/or 234, which is capable of rendering black and white or color. The image processing unit 340 can perform various processes such as decomposition and halftoning of the image 320, color transforms, scaling, and other required processes. The image processing unit 340 can operate in conjunction with the high speed rendering devices 230, 232, and 234, personal computers 100 or workstations capable of driving personal rendering devices.

The image processing unit 340 includes a darkness control module 350, which can adjust the apparent darkness of the images 320 rendered at the output device 360. The darkness control module 350 processes the image data 320 in a controlled approach for darkening bitmap images. The image data 320 may include binarized images while targeted for the rendering device 230 and may appear to exhibit the same darkness level when sent to different rendering device 232 when the darkness level of bitmap images 320 are controlled by the darkness control module 350.

A request for an additional darkening level can be provided through a customer input file 380. Note that such additional darkening levels may be maintained within a database. A user interface 370 can be utilized to selectively test and choose the darkening level for the image data 320. The image output device 360 can be configured to store each new darkening level so that a user is provided with an opportunity to select the darkening level from an array of darkening levels from database and assist in output matching without major modifications to the image output device 360. The storage unit 240 can be utilized to store the darkening levels for future use.

Figure 4:
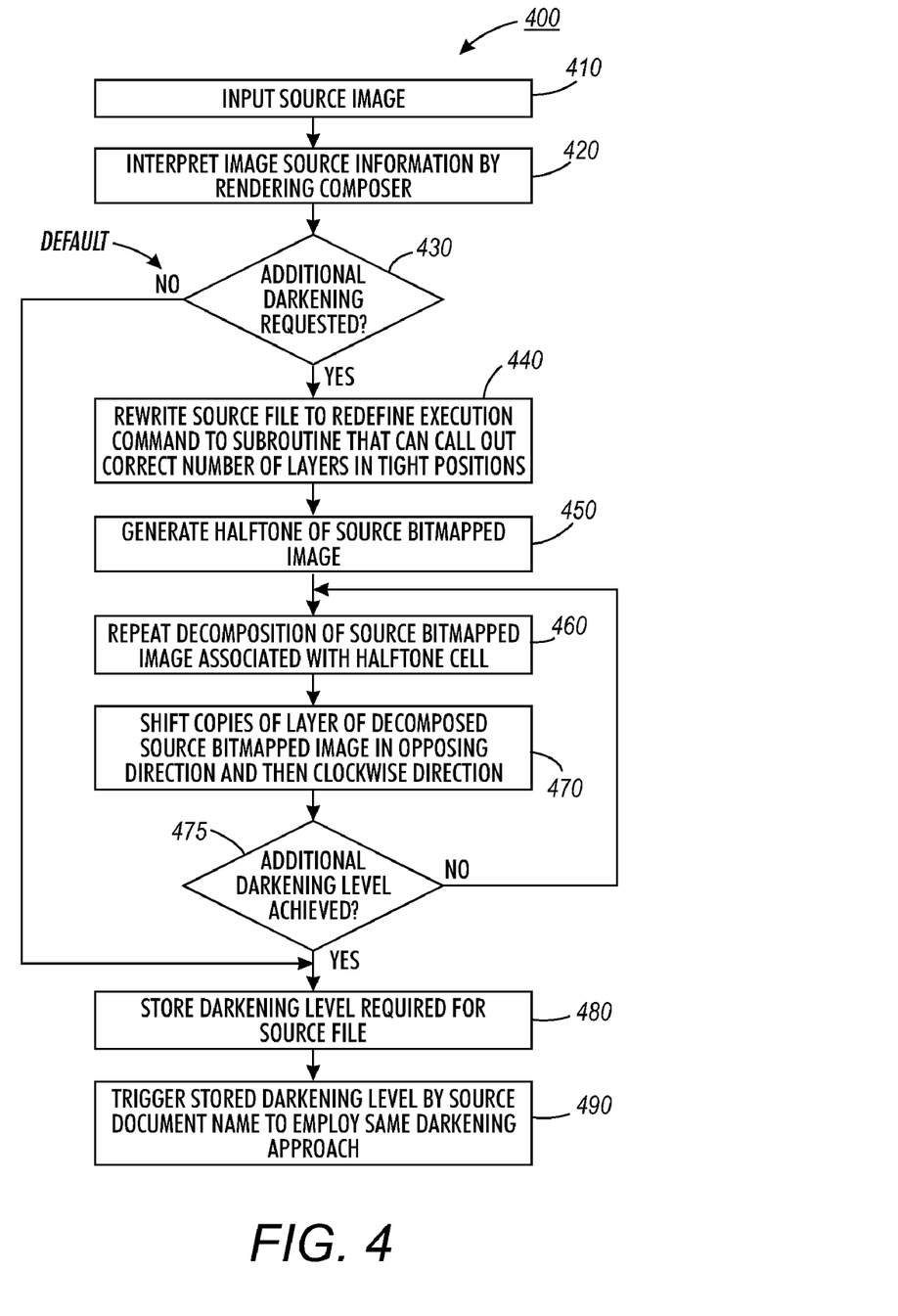
FIG. 4 illustrates a detailed flow chart of operations illustrating logical operational steps of a method for controlling a darkness level of bitmap images, in accordance with a preferred embodiment.

FIG. 4 illustrates a flow chart of operations depicting a method 400 for controlling the darkness of image data 320 (i.e., the source image), in accordance with a preferred embodiment. Again, as a reminder, in FIGS. 1-6 identical or similar elements and components are generally indicated by identical reference numerals. The source file 305 can be provided as input to the input device 310, as illustrated at block 410 in FIG. 4. The source information associated with the image data 320 generated by the input device 310 can be interrupted by the rendering decomposer module 330, as indicated thereafter at block 420.

Thereafter, a test may be performed, as illustrated at block 430, to determine whether or not an additional darkening level has been requested via the user input file 380, as described at block 430. If not, then the operations depicted at blocks 480 and 490 are then processed. That is, if the additional darkening level has not been requested, the original "darkness" associated with the source data can be stored in the storage unit 340, as indicated at block 480. Following the processing of the operation depicted at block 480, an operation can be processed in which stored darkening levels are triggered by a source document name to employ the same darkening approach, as indicated at block 490.

If the request for additional darkening level is received, however, the source file 305 can be rewritten to redefine the execution command to a subroutine capable of calling out a correct number of additional layers, as depicted at block 440. Next, as indicated at block 450, an operation can be processed in which halftone source image data is generated. The copying of the image source data associated with halftone cell can then be repeated, as illustrated at block 460. Thereafter, the additional darkening layer can be shifted in opposing and then clockwise directions, as indicated at block 470.

Next, as indicated at block 475, a test can be performed to determine whether or not an additional darkening level has been attained. If the additional darkening level is not achieved, then the respective operations depicted at blocks 460 and 470 involving copying of the image data 320 and the addition of the darkening layer can be repeated. If the required additional darkening level is achieved, the darkening level required for the source file 305 can be stored in the storage unit 240, as illustrated at block 480. The darkening levels stored in the storage unit 240 can be triggered by a source document name to employ the same darkening approach, as indicated at block 490. The method 400 for controlling the darkness of the source image 320 depicted in FIG. 4 can therefore generate the same output from dissimilar rendering devices 230, 232, and 234.

Figure 5:
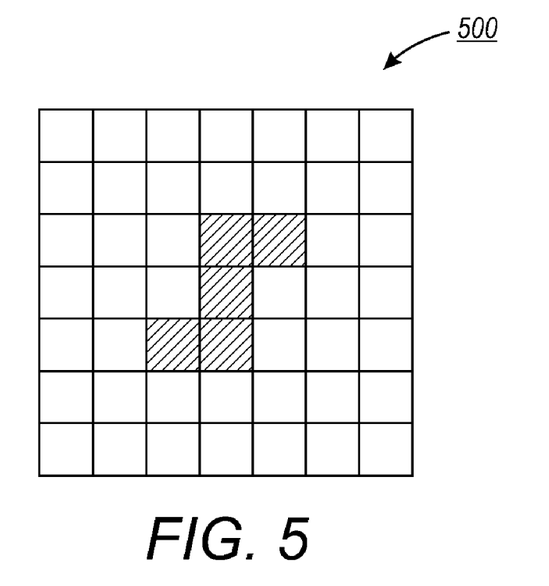
FIG. 5 is a schematic illustration of a halftone cell, in accordance with an exemplary embodiment.
Figure 6:
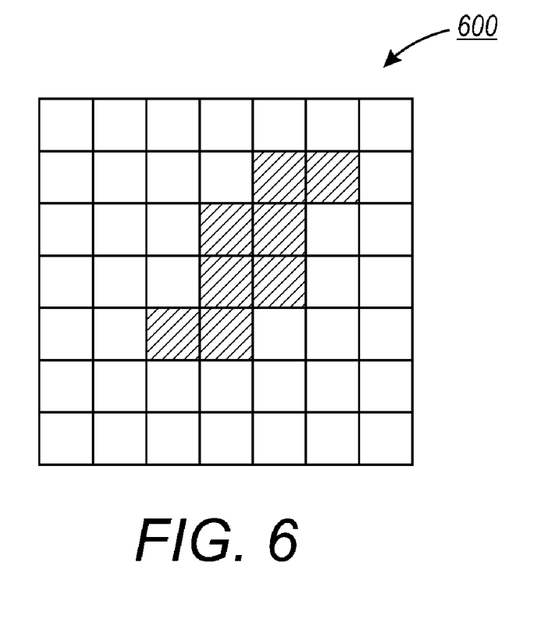
FIG. 6 is a schematic illustration of the halftone cell with additional layer shifted to one pixel to a right side and one pixel upwards, in accordance with an exemplary embodiment.

FIG. 5 is a schematic illustration of a halftone cell 500, in accordance with an exemplary embodiment. In general, a halftone cell comprises an array of pixels which can be stored with different color depths. The halftone cell 500 represents an array of 7 by 7 pixels. The image source information can be interpreted by the rendering decomposer 330 and provides that the halftone cell 500 has 5 pixels turned "black". The decomposition of the image can be repeated and shifted in position in response to the request by the operator for additional darkening level. For example, FIG. 6 illustrates an application of another layer of the halftone cell shifted 1 pixel to a right side and one upwards. The halftone cell area 600 includes three black pixels and some of the new layer's black pixels fell on some of the previous layer's black pixels. Because of the overlapping effect, the major effect is seen more on the lower "gray" value areas of the overall image than the darker areas.

Thereafter, one pixel can be shifted to a left side and one downwards from an original position of the source image for a second additional layer. For a third additional layer, one pixel is shifted to the left side and one pixel upwards from the original position of the source image. For a fourth additional layer, one pixel is shifted to the right side and one downwards from the original position of the source image. Additional layers can also be applied on a vertical and horizontal axis for additional darkening of the image. The additional layer for a pictorial file can be first applied in a +45 degree direction and, if an additional darkness increase is necessary, the additional layers can be included in −45, +135, and −135 degree directions. The additional layers can be applied vertically and horizontally until a best match can be achieved.

The darkening can be omitted or a reduced level of darkening can be applied for a text file. The user interface 370 can be utilized to allow selectively test and choose the darkening level for bitmap images. The darkening of the shadow tones of a monochrome image can be done by an image overlay and the circular application of image overlays minimizes "smudging" artifacts. The adjustment of darkness level of bitmap image normalizes the rendered output from dissimilar rendering systems both in house and between vendors.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for controlling darkening of image data, said method comprising:
    decomposing image source data to generate decomposed image source data in response to a request for an additional darkening level, wherein said image source data comprises at least one halftone cell; and
    shifting at least one additional layer of said decomposed image source data in an opposing direction and thereafter a clockwise direction until said additional darkening level is attained in order to assist output matching between rendering devices.

2. The method of claim 1 wherein said image source data comprises a source bitmap image.

3. The method of claim 1 further comprising interpreting image source information from a source file utilizing a rendering decomposer in order to generate said image source data, wherein said image source data includes said at least one halftone cell.

4. The method of claim 3 further comprising rewriting said source file to redefine an execution command with respect to a particular subroutine, wherein said particular subroutine calls out a correct number of additional layers.

5. The method of claim 3 further comprising storing in a storage unit, said additional darkening level required within respect said source file, wherein said additional darkening level is triggered by a source document name to employ said additional darkening level.

6. The method of claim 5 further comprising selecting a darkening level from said storage unit in order to assist said output matching without significant modifications to at least one rendering device among said rendering devices.

7. The method of claim 3 wherein said source file comprises text data.

8. The method of claim 7 further comprising applying a reduced level of darkening to said text data.

9. The method of claim 3 wherein said source file comprises at least one pictorial image.

10. The method of claim 9 further comprising thereafter applying said at least one additional layer of at least one said halftone cell for said at least one pictorial image in the following directions:
- a +45 degree direction;
- a −45 degree direction;
- a +135 degree direction; and
- a −135 degree direction.

11. The method of claim 1 further comprising adding said at least one additional layer in a vertical direction and a horizontal direction until said additional darkening level is attained.

12. A system for controlling darkening of image data, said system comprising:
- a processor;
- a data bus coupled to said processor; and
- a computer-usable medium embodying computer code, said computer-usable medium being coupled to said data bus, said computer program code comprising instructions executable by said processor and configured for:
  - decomposing image source data to generate decomposed image source data in response to a request for an additional darkening level, wherein said image source data comprises at least one halftone cell; and
  - shifting at least one additional layer of said decomposed image source data in an opposing direction and thereafter a clockwise direction until said additional darkening level is attained in order to assist output matching between rendering devices.

13. The system of claim 12 wherein said image source data comprises a source bitmap image.

14. The system of claim 12 wherein said instructions are further configured for:
- interpreting image source information from a source file utilizing a rendering decomposer in order to generate said image source data, wherein said image source data includes said at least one halftone cell; and
- rewriting said source file to redefine an execution command with respect to a particular subroutine, wherein said particular subroutine calls out a correct number of additional layers.

15. The system of claim 14 wherein said instructions are further configured for storing in a storage unit, said additional darkening level required within respect said source file, wherein said additional darkening level is triggered by a source document name to employ said additional darkening level; and selecting a darkening level from said storage unit in order to assist said output matching without significant modifications to at least one rendering device among said rendering devices.

16. The system of claim 14 wherein said source file comprises text data.

17. The system of claim 16 wherein said instructions are further configured for:
- applying a reduced level of darkening to said text data; and
- applying said at least one additional layer of at least one said halftone cell for said at least one pictorial image in the following directions:
  - a +45 degree direction;
  - a −45 degree direction;
  - a +135 degree direction; and
  - a −135 degree direction.

18. The system of claim 14 wherein said source file comprises at least one pictorial image.

19. The system of claim 12 wherein said instructions are further configured for adding said at least one additional layer in a vertical direction and a horizontal direction until said additional darkening level is attained.

20. A system for controlling darkening of image data, said system comprising:
- a processor;
- a data bus coupled to said processor; and
- a non-transitory computer-usable medium embodying computer code, said computer-usable medium being coupled to said data bus, said computer program code comprising instructions executable by said processor and configured for:
  - decomposing image source data to generate decomposed image source data in response to a request for an additional darkening level, wherein said image source data comprises at least one halftone cell;
  - shifting at least one additional layer of said decomposed image source data in an opposing direction and thereafter a clockwise direction until said additional darkening level is attained in order to assist output matching between rendering devices; and
  - interpreting image source information from a source file utilizing a rendering decomposer in order to generate said image source data, wherein said image source data includes said at least one halftone cell.

* * * * *